DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 17, 1973

909 O.G. 797

T909,024
POLYMERIC COMPOSITIONS
James L. Suggs, 4241 Maplewood St., Kingsport, Tenn. 37660
Filed Oct. 2, 1972, Ser. No. 294,416
Int. Cl. C08g *17/10*
U.S. Cl. 260—861
No Drawing. 13 Pages Specification

Polyesters of 2,2,4-trimethylpentane-1,3-diol, an ethylenically unsaturated acid or anhydride such as maleic, and a polyhydric compound containing at least three hydroxyl groups are used with a vinyl monomer such as styrene, which is a solvent for the polyester, as a general purpose resin. The polyester is prepared with relatively little decomposition of the diol. The unsaturated polyester-vinyl monomer solution may be used as a general purpose resin for castings, coatings and the like by copolymerization using metal promoted, organic peroxide initiator systems at room temperatures. The polyol is present in amounts of from about 1 to about 30 mole percent, based on the combined moles of the polyol and diol. The polyester is present in the composition in amounts between about 40% and about 70% and the vinyl monomer in amounts of between about 60% and about 30%, by weight based on the total weight of the composition.